US011593111B2

(12) United States Patent
Arsanto et al.

(10) Patent No.: US 11,593,111 B2
(45) Date of Patent: Feb. 28, 2023

(54) APPARATUS AND METHOD FOR INHIBITING INSTRUCTION MANIPULATION

(71) Applicant: Arm Limited, Cambridge (GB)

(72) Inventors: Frederic Jean Denis Arsanto, Le Rouret (FR); Carlo Dario Fanara, Antibes (FR); Luca Scalabrino, Villeneuve Loubet (FR); Jean Sébastien Leroy, Alpes-Maritimes (FR)

(73) Assignee: Arm Limited, Cambridge (GB)

( * ) Notice: Subject to any disclaimer, the term of this patent is extended or adjusted under 35 U.S.C. 154(b) by 482 days.

(21) Appl. No.: 16/773,059

(22) Filed: Jan. 27, 2020

(65) Prior Publication Data

US 2021/0232396 A1 Jul. 29, 2021

(51) Int. Cl.
*G06F 9/30* (2018.01)
*G06F 9/38* (2018.01)

(52) U.S. Cl.
CPC .......... *G06F 9/3016* (2013.01); *G06F 9/3802* (2013.01)

(58) Field of Classification Search
CPC ............... G06F 9/3016; G06F 9/30145; G06F 9/30178; G06F 9/3802; G06F 21/12;
(Continued)

(56) References Cited

U.S. PATENT DOCUMENTS 4,168,396 A * 9/1979 Best ...................... G06F 21/123
380/37
4,278,837 A * 7/1981 Best ........................ G06F 21/72
726/16

(Continued)

OTHER PUBLICATIONS

Gaurav S. Kc, Angelos D. Keromytis, and Vassilis Prevelakis. Countering code-injection attacks with instruction-set randomization. In Proceedings of the 10th ACM conference on Computer and communications security (CCS '03). Association for Computing Machinery, New York, NY, USA, pp. 272-280. (Year: 2003).*

(Continued)

*Primary Examiner* — Jyoti Mehta
*Assistant Examiner* — Kasim Alli
(74) *Attorney, Agent, or Firm* — Nixon & Vanderhye P.C.

(57) ABSTRACT

An apparatus and method are provided for inhibiting instruction manipulation. The apparatus has execution circuitry for performing data processing operations in response to a sequence of instructions from an instruction set, and decoder circuitry for decoding each instruction in the sequence in order to generate control signals for the execution circuitry. Each instruction comprises a plurality of instruction bits, and the decoder circuitry is arranged to perform a decode operation on each instruction to determine from the value of each instruction bit, and knowledge of the instruction set, the control signals to be issued to the execution circuitry in response to that instruction. An input path to the decoder circuitry comprises a set of wires over which the instruction bits of each instruction are provided. Scrambling circuitry is used to perform a scrambling function on each instruction using a secret scrambling key, such that the wire within the set of wires over which any given instruction bit is provided to the decoder circuitry is dependent on the secret scrambling key. The decode operation performed by the decoder circuitry is then adapted to incorporate a descrambling function using the secret scrambling key to reverse the effect of the scrambling function. As a result, independent of which wire any given instruction bit is provided on, the decode operation is arranged when decoding a given instruction to correctly interpret each instruction bit of that given instruction, based on knowledge of the instruction set, in order to determine from the value of each instruction bit the control signals to be issued to the execution circuitry in response to that given instruction.

9 Claims, 6 Drawing Sheets

(58) Field of Classification Search
CPC ...... G06F 21/125; G06F 21/14; G06F 21/556; G06F 21/71; G06F 21/75
See application file for complete search history.

(56) References Cited

U.S. PATENT DOCUMENTS

| | | | | |
|---|---|---|---|---|
| 4,306,289 | A * | 12/1981 | Lumley | G06F 21/72 713/190 |
| 4,633,388 | A * | 12/1986 | Chiu | G06F 21/123 712/E9.028 |
| 6,247,120 | B1 * | 6/2001 | Schwendinger | G06F 9/3814 712/E9.055 |
| 7,493,483 | B2 * | 2/2009 | McIntosh | G06F 9/30145 726/25 |
| 9,177,111 | B1 * | 11/2015 | Squires | G06F 21/00 |
| 2004/0015710 | A1 * | 1/2004 | Rhodes | G06F 21/125 713/193 |
| 2005/0108507 | A1 * | 5/2005 | Chheda | G06F 9/30167 712/E9.035 |
| 2007/0074046 | A1 * | 3/2007 | Czajkowski | G06F 21/14 713/190 |
| 2007/0220601 | A1 * | 9/2007 | Huelsbergen | G06F 21/72 726/22 |
| 2008/0126766 | A1 * | 5/2008 | Chheda | G06F 9/30145 712/E9.067 |
| 2012/0137140 | A1 * | 5/2012 | Berengoltz | H04N 21/44218 713/189 |
| 2016/0104010 | A1 * | 4/2016 | Henry | H04L 9/0891 713/190 |
| 2020/0320209 | A1 * | 10/2020 | Cohen | G06F 21/629 |
| 2021/0203504 | A1 * | 7/2021 | Brandt | H04L 9/3226 |

OTHER PUBLICATIONS

Wikipedia contributors, 'Central processing unit', Wikipedia, The Free Encyclopedia, <https://en.wikipedia.org/w/index.php?title=Central_processing_unit&oldid=879846747> (Year: 2019).*

* cited by examiner

CONDITION CODE BITS = INST$^N$_SCRAMBLED [fn (31, SCRAMBLING KEY)]
AND INST$^N$_SCRAMBLED [fn (30, SCRAMBLING KEY)]
AND INST$^N$_SCRAMBLED [fn (29, SCRAMBLING KEY)]
AND INST$^N$_SCRAMBLED [fn (28, SCRAMBLING KEY)]

(fn = BIJECTIVE FUNCTION)

FIG. 5

APPARATUS AND METHOD FOR INHIBITING INSTRUCTION MANIPULATION

BACKGROUND

The present technique relates to an apparatus and method for inhibiting instruction manipulation.

A data processing device may be arranged to execute a sequence of instructions in order to perform data processing operations. Typically, the data processing device will execute instructions from an identified instruction set, and information about the instruction set will be publicly available. In particular, published information about the instruction set will identify the instructions provided within the instruction set and how the various bits of each instruction are interpreted. For example, for a given instruction within an instruction set, it will be known which bits specify the opcode defining the operation required to be performed in response to that instruction, which bits specify any condition codes that are used to determine whether the instruction should be executed or not, which bits specify source operands (either as immediate values or with reference to register identifiers), and which bits specify the destination register into which the result should be written.

In modern data processing systems it is becoming more and more important to provide measures to protect those systems from attack by hackers. Various anti-tampering features have been developed for use within data processing systems, but one identified area of vulnerability is at the input to the decoder circuitry used to decode each instruction. In particular, at the input to the decoder circuitry there will typically be a set of wires over which the instruction bits of each instruction are provided. If an attacker can identify these wires within the data processing device, then with knowledge of the instruction set being used, it may be possible to identify which pieces of information regarding an instruction are propagated over which wires within the set of wires. It may then be possible for such an attacker to seek to employ a physical attack in respect of those wires, for example using laser photo injection or electromagnetic attacks, in order to seek to manipulate the values presented on certain wires. It will be appreciated that such an activity could cause the decoder circuitry to be presented with an altered form of the intended instruction, which as a result could alter the execution behaviour of the data processing device. Purely by way of example, by such an attack an attacker may be able to alter the bits specifying the condition information relating to the instruction, and hence alter the intended behaviour as to whether the instruction should be executed or not.

It would be desirable to provide an anti-tampering feature which could protect the data processing device from such an attack.

SUMMARY

In one example arrangement, there is provided an apparatus comprising: execution circuitry to perform data processing operations in response to a sequence of instructions from an instruction set; decoder circuitry to decode each instruction in the sequence in order to generate control signals for the execution circuitry to cause the execution circuitry to perform the data processing operations required by the sequence of instructions, each instruction comprising a plurality of instruction bits and the decoder circuitry being arranged to perform a decode operation on each instruction to determine from the value of each instruction bit, and knowledge of the instruction set, the control signals to be issued to the execution circuitry in response to that instruction; an input path to the decoder circuitry comprising a set of wires over which the instruction bits of each instruction are provided; and scrambling circuitry to perform a scrambling function on each instruction using a secret scrambling key, such that the wire within the set of wires over which any given instruction bit is provided to the decoder circuitry is dependent on the secret scrambling key; wherein the decode operation performed by the decoder circuitry is arranged to incorporate a descrambling function using the secret scrambling key to reverse the effect of the scrambling function, such that, independent of which wire any given instruction bit is provided on, the decode operation is arranged when decoding a given instruction to correctly interpret each instruction bit of that given instruction, based on knowledge of the instruction set, in order to determine from the value of each instruction bit the control signals to be issued to the execution circuitry in response to that given instruction.

In another example arrangement, there is provided a method of inhibiting instruction manipulation within an apparatus, comprising: employing execution circuitry to perform data processing operations in response to a sequence of instructions from an instruction set; employing decoder circuitry to decode each instruction in the sequence in order to generate control signals for the execution circuitry to cause the execution circuitry to perform the data processing operations required by the sequence of instructions, each instruction comprising a plurality of instruction bits and the decoder circuitry being arranged to perform a decode operation on each instruction to determine from the value of each instruction bit, and knowledge of the instruction set, the control signals to be issued to the execution circuitry in response to that instruction; providing an input path to the decoder circuitry comprising a set of wires over which the instruction bits of each instruction are provided; performing a scrambling function on each instruction using a secret scrambling key, such that the wire within the set of wires over which any given instruction bit is provided to the decoder circuitry is dependent on the secret scrambling key; and incorporating within the decode operation performed by the decoder circuitry a descrambling function using the secret scrambling key to reverse the effect of the scrambling function, such that, independent of which wire any given instruction bit is provided on, the decode operation is arranged when decoding a given instruction to correctly interpret each instruction bit of that given instruction, based on knowledge of the instruction set, in order to determine from the value of each instruction bit the control signals to be issued to the execution circuitry in response to that given instruction.

In a still further example arrangement, there is provided an apparatus comprising: execution means for performing data processing operations in response to a sequence of instructions from an instruction set; decoder means for decoding each instruction in the sequence in order to generate control signals for the execution means to cause the execution means to perform the data processing operations required by the sequence of instructions, each instruction comprising a plurality of instruction bits and the decoder means for performing a decode operation on each instruction to determine from the value of each instruction bit, and knowledge of the instruction set, the control signals to be issued to the execution means in response to that instruction; an input path to the decoder means comprising a set of wires over which the instruction bits of each instruction are provided; and scrambling means for performing a scrambling function on each instruction using a secret scrambling key, such that the wire within the set of wires over which any given instruction bit is provided to the decoder means is dependent on the secret scrambling key; wherein the decode operation performed by the decoder means is arranged to incorporate a descrambling function using the secret scrambling key to reverse the effect of the scrambling function, such that, independent of which wire any given instruction bit is provided on, the decode operation is arranged when decoding a given instruction to correctly interpret each instruction bit of that given instruction, based on knowledge of the instruction set, in order to determine from the value of each instruction bit the control signals to be issued to the execution means in response to that given instruction.

BRIEF DESCRIPTION OF THE DRAWINGS

The present technique will be described further, by way of illustration only, with reference to examples thereof as illustrated in the accompanying drawings, in which:

FIG. 5 schematically illustrates a descrambling function that may be performed within the decoder circuitry of FIG. 1 in order to identify the bits within the scrambled instruction representing particular properties of the instruction, the illustration in FIG. 5 indicating in particular how the condition code bits may be identified from the scrambled instruction.

DESCRIPTION OF EXAMPLES

Figure 1:
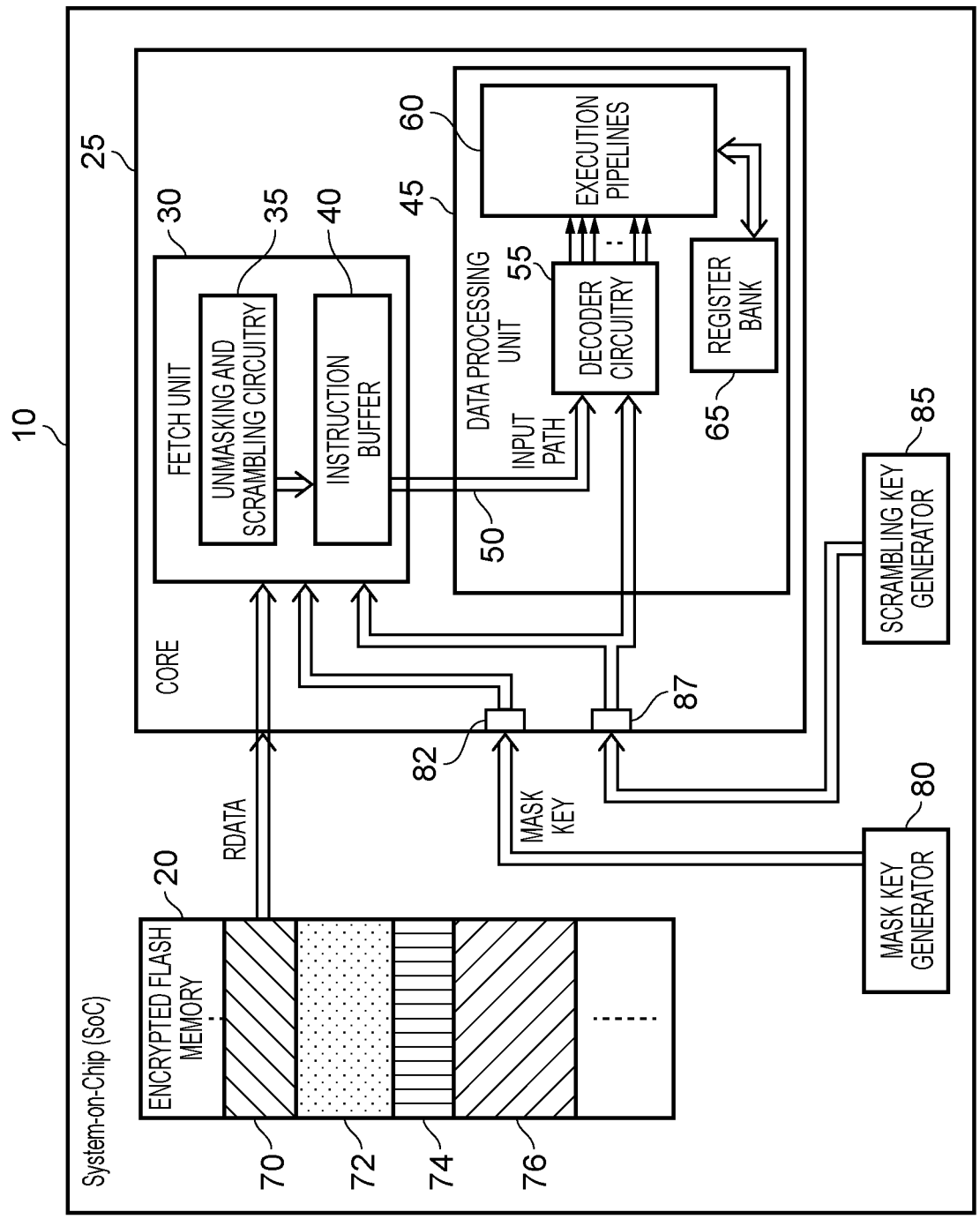
FIG. 1 is a block diagram of a system in accordance with one example arrangement.

In accordance with the techniques described herein an apparatus may be provided with execution circuitry for performing data processing operations in response to a sequence of instructions from an instruction set, and further has decoder circuitry to decode each instruction in the sequence in order to generate control signals for the execution circuitry, which cause the execution circuitry to perform the data processing operations required by the sequence of instructions. Each instruction comprises a plurality of instruction bits and the decoder circuitry is arranged to perform a decode operation on each instruction to determine from the value of each instruction bit, and knowledge of the instruction set, the control signals to be issued to the execution circuitry in response to that instruction. In particular, based on knowledge of the instruction set, the decoder circuitry knows which properties of the instruction are identified by which instruction bits. Accordingly it can analyse the various instruction bits in order to determine the data processing operation that needs to be performed in response to that instruction, the source operands required for that data processing operation (which may either be specified as immediate values within the instruction, or be specified with reference to one or more register identifiers identifying registers within a register set that store the source operands), a register into which the result produced by performance of the operation should be stored, and any condition information used to assess whether the data processing operation should or should not be performed.

The apparatus also has an input path to the decoder circuitry that comprises a set of wires over which the instruction bits of each instruction are provided. As mentioned earlier, this can represent a point of vulnerability within the apparatus, as it may be possible for an attacker to identify which wires in the set are used to convey which instruction bits, and hence to seek to perform an attack on the set of wires with the aim of seeking to manipulate certain of the instruction bits.

However, in accordance with the techniques described herein, scrambling circuitry is provided that performs a scrambling function on each instruction using a secret scrambling key, such that the wire within the set of wires over which any given instruction bit is provided to the decoder circuitry is dependent on the secret scrambling key. This can inhibit an attacker from determining which wire is used to provide to the decoder circuitry any particular instruction bit, and hence inhibit the attacker's ability to perform an attack.

However, it will be appreciated that it is essential for the decoder circuitry to correctly interpret each instruction bit. In accordance with the techniques described herein, the decode operation performed by the decoder circuitry is arranged to incorporate a descrambling function using the secret scrambling key to reverse the effect of the scrambling function. As a result, independent of which wire any given instruction bit is provided on, the decode operation is arranged when decoding a given instruction to correctly interpret each instruction bit of that given instruction, based on knowledge of the instruction set, and hence can determine from the value of each instruction bit the control signals to be issued to the execution circuitry in response to that given instruction.

It has been found that the use of such a technique can significantly inhibit the ability of an attacker to seek to tamper with the instructions being executed by the execution circuitry, and in particular inhibit the ability of the attacker to perform targeted attacks on the instructions being provided at the input to the decoder circuitry. In particular, whilst an attacker can still in principle perform a physical attack on the set of wires, the above described technique inhibits the ability of the attacker to target the attack on particular instruction bits with the aim of seeking to make specific changes to the instructions prior to them being decoded, since it inhibits the ability of the attacker to determine which wire is used to input to the decoder circuitry any particular instruction bit.

The scrambling circuitry may be provided at a variety of locations within the apparatus. However, in one example implementation the apparatus further comprises fetch circuitry to fetch the instructions from a memory device, with the fetch circuitry having an instruction buffer to store the fetched instructions prior to provision of the fetched instructions over the input path to the decoder circuitry. In one example implementation the scrambling circuitry is provided in association with the fetch circuitry to apply the scrambling function to the fetched instructions prior to those fetched instructions being stored in the instruction buffer. This ensures that the instructions are not held in the instruction buffer in unscrambled form.

In some instances, the instructions as stored in the memory device are encrypted using any suitable encryption scheme, a specific example of which would be a masking scheme. The apparatus then further comprises decryption circuitry to decrypt the instructions prior to provision of those instructions to the decoder circuitry. It will be appreciated that once an instruction is decrypted, the instruction is then present in its standard form as specified by the instruction set, but in order to reduce the chance of that instruction being visible to an attacker, in accordance with the techniques described herein the scrambling circuitry may be incorporated within the decryption circuitry. For instance, when considering the earlier example where the instruction is placed in an instruction buffer prior to being provided to the decoder circuitry, the decryption circuitry and associated scrambling circuitry may be arranged to both decrypt the instructions and scramble them prior to those instructions being placed within the instruction buffer.

In one particular example implementation, the decryption circuitry and the scrambling circuitry are integrated so that each input encrypted instruction is subjected to a combined decryption and scrambling operation that generates as an output a corresponding decrypted instruction with positions of its instruction bits scrambled based on the secret scrambling key, without generating as an intermediate result the corresponding decrypted instruction in unscrambled form. By integrating the two functions in this way, this avoids the standard form of the instruction being visible at any point prior to it being input to the decoder circuitry, hence increasing the robustness of the apparatus to any attacks seeking to manipulate the instructions.

As mentioned earlier, the instructions as stored in the memory device may be encrypted. Any suitable encryption scheme can be used. For example, a chosen encryption function could use multiple bits of the instruction to create each bit in the encrypted instruction. However, in one particular example implementation the encryption function takes the form of a masking function based on a secret mask key. When employing such a masking function, there is a bit to bit correspondence between the input instruction and the masked version of the instruction created by the masking function. In particular, a simple function such as an XOR function may be used on each bit of the input instruction, using a corresponding bit in the secret mask key, in order to generate the corresponding masked instruction bit of the encrypted instruction.

In such an implementation that uses a masking function, then the combined decryption and scrambling operation mentioned earlier may receive as inputs an input encrypted instruction, the secret mask key and the secret scrambling key, and based thereon produce a corresponding decrypted instruction with the positions of its instruction bits scrambled.

Whilst in one example implementation the secret scrambling key could be fixed, in an alternative implementation the secret scrambling key may be changed on occurrence of a determined event. Whilst in one example implementation there may be a scrambling key generator provided externally to the apparatus, and on occurrence of the determined event that external scrambling key generator may be arranged to alter the secret scrambling key, in an alternative implementation the actions of the external scrambling key generator do not need to be correlated within the determined event. For example, the apparatus may further comprise an interface that is arranged to sample, on occurrence of the determined event, the value of the secret scrambling key as provided by such a scrambling key generator. With such an approach, the scrambling key generator can change the secret scrambling key as and when desired, for example at random points in time. Then, when the apparatus detects that the determined event has occurred, it can sample the latest value of the secret scrambling key and thereafter use that sampled value.

The determined event can take a variety of forms, and indeed there may be multiple different types of determined events that the apparatus seeks to detect. As an example, the determined event may comprise a reset of the apparatus, so that each time the apparatus is reset a new secret scrambling key is sampled by the apparatus. As another example, the determined event may comprise an event indicating that the decoder circuitry is an idle state where no active instructions are in the process of being decoded by the decoder circuitry. This can arise in a variety of situations. For example, the fetch unit could be arranged to cease issuing instructions to the decoder circuitry for a chosen number of clock cycles, or to issue dummy instructions during those chosen number of clock cycles, so as to ensure that following the elapse of those clock cycles, no active instructions are in the process of being decoded. However, in some implementations, it may be unnecessary to provide such functionality, and the determined event may be detected whenever the instruction buffer is empty. If desired, detection of the determined event may be arranged to occur a predetermined number of cycles after the instruction buffer becomes empty, so as to ensure that any previously issued instructions have had time to pass through the decoder circuitry.

The scrambling function can take a variety of forms, but in one example implementation the scrambling function and the descrambling function are a bijective function. A bijective function is a function between the elements of two sets, where each element of one set is paired with exactly one element of the other set, and each element of the other set is paired with exactly one element of the first set. As a result, the bijective function can be applied once to convert an unscrambled instruction into a corresponding scrambled instruction, and then the bijective function can be applied again to convert the scrambled instruction back into the original unscrambled instruction.

Particular examples will now be described with reference to the Figures.

FIG. 1 is a block diagram of a system in accordance with one example implementation. In particular, this system is provided as a system-on-chip (SoC) 10 that can be considered to form a secure system. The SoC 10 has a processor core 25 that forms an apparatus in which the techniques described herein are employed. The processor core 25 has a fetch unit 30 for fetching instructions from a memory device, which in the specific example shown takes the form of an encrypted flash memory 20. The instructions may be encrypted within the flash memory 20, and in a particular example implementation the encryption takes the form of a masking function, and hence the instructions stored within the flash memory 20 are masked instructions generated from the original instructions using a mask key. The mask key is generated by a mask key generator circuit 80, which in one example implementation can be provided within the SoC 10. If desired, different regions of memory 70, 72, 74, 76 may be encrypted using different mask keys, with the mask key generator 80 generating the relevant mask keys for each of the different regions of memory. The mask keys can be sampled by the interface 82 of the processor core 25, and then provided to the fetch unit 30 to enable the masked instructions retrieved from the flash memory 20 to be unmasked using unmasking circuitry 35, prior to the instructions being stored within an instruction buffer 40 of the fetch unit.

In a typical system, these unmasked instructions may then be input over an input path 50 to decoder circuitry 55 within the data processing unit 45 of the processor core 25, where those instructions are then decoded in order to generate control signals that are issued to the execution pipelines 60 of the data processing unit in order to cause the required data processing operations to be performed as defined by those instructions. During performance of those data processing operations, the execution pipeline 60 will have access to a register bank 65 providing a set of registers within which source operand values may be retrieved, and into which result data may be written.

As mentioned earlier, the input path 50 will typically comprise a set of wires over which the instruction bits of each instruction are provided. In accordance with any particular instruction set, the instructions may have a defined size, and hence for example instructions may be 32-bit instructions comprising 32 instruction bits. If it is known which individual wire of the input path each instruction bit is provided on, then an attacker could potentially seek to perform a physical attack on one or more of the wires within the input path 50 to seek to manipulate instructions prior to them being decoded by the decoder circuitry 55, and thereby alter the intended operation of the processor core. This is a particular point of vulnerability, since the input interface to the decoder circuitry 55 is typically relatively simple, and further information about the format of the instructions in any given instruction set is typically readily available. Hence an attacker will know which instruction bits are used to encode which properties of the instructions, for example which instruction bits represent condition information used to determine whether an instruction will be executed, which bits identify the opcode of the instruction, etc.

In order to seek to inhibit the performance of such an attack, in accordance with the techniques described herein a scrambling key generator 85 is used to generate a scrambling key. As shown in FIG. 1, the scrambling key generator can in one example implementation be provided within the SoC 10. The value of the scrambling key produced by the scrambling key generator can then be sampled at the interface 87 of the processor core 25 and thereafter that sampled value may be provided to both the fetch unit 30 and the decoder circuitry 55.

As shown in FIG. 1, the unmasking circuitry 35 provided within the fetch unit can be augmented so as to also form scrambling circuitry, so that the resultant circuitry performs both an unmasking function and a scrambling function in order to produce output instructions for storing in instruction buffer 40. As a result, when the unmasking function is applied to the encrypted instructions retrieved from memory 20, then rather than outputting the instructions in their unmasked form into the instruction buffer, instructions are at the same time scrambled so that the instructions stored within the instruction buffer are scrambled instructions. The scrambling function may for example be implemented as a bijective function so that each instruction bit is mapped from its original location in the standard instruction format into a location that is dictated by the scrambling key. As a result, when any given instruction in the instruction buffer 40 is output over the input path 50 to the decoder circuitry 55, the actual wire over which any given instruction bit is provided to the decoder circuitry is dependent on the secret scrambling key. Hence, even with knowledge of the format of the instructions in the instruction set, an attacker cannot determine with any certainty which wire will carry any particular instruction bit of the instruction, which inhibits the attacker's ability to perform a successful manipulation of the instructions in an intended manner.

However, it is important that the decoder circuitry 55 can correctly identify each instruction bit, since only then will it be able to correctly decode each instruction and hence produce the required control signals for the execution pipeline 60. As shown in FIG. 1, this can be achieved by also routing the scrambling key to the decoder circuitry 55. The decode operation performed by the decoder circuitry can then be augmented so as to incorporate a descrambling function using the secret scrambling key in order to reverse the effect of the scrambling function applied by the circuitry 35 within the fetch unit 30. As a result, the decoder circuitry can correctly interpret each instruction bit and produce the required control signals.

Returning to the discussion of the unmasking and scrambling circuitry 35, then when that circuitry receives an input instruction from the flash memory 20 it will know the memory address of that instruction, and hence which mask key should be used, with that mask key being obtained from the interface 82. It can then perform an unmasking function that is dependent on the address region containing the instruction in question, and at the same time perform a scrambling function using the scrambling key retrieved from the interface 87. Typically, it will be sufficient to employ a single scrambling key that can be applied for instructions irrespective of the address within the flash memory that those instructions are retrieved from.

The scrambling key and the mask key(s) can be considered secret keys since they are only made available inside the SoC 10, which forms a secure system, and hence are not available to an attacker seeking to instigate an attack from outside the SoC.

Whilst the scrambling key, and indeed the mask key(s) can be fixed, in one example implementation they can be altered over time so as to further improve the robustness of the system. Considering specifically the scrambling key, the scrambling key generator 85 may be arranged to change the scrambling key value at arbitrary points in time, and the processor core 25 can be arranged to sample at its interface 87 the current value output by the scrambling key on occurrence of one or more determined events. For example, when the system is reset, the processor core 25 may resample the input from the scrambling key generator 85 at its interface 87, and thereafter use that scrambling key for subsequent scrambling and descrambling operations performed by the fetch unit 30 and the decoder circuitry 55, respectively.

However, if desired the system can be arranged to alter the scrambling key at other points in time, rather than merely on a reset. For example, if it is known that the decoder circuitry 55 is not actively decoding any instructions, then this can be a point in time at which the scrambling key can be readily changed. In the implementation shown in FIG. 1, it would also be appropriate for the instruction buffer 40 to be empty at that time, so that it is known that the decoder circuitry 55 will no longer have any need to use the previous scrambling key. Hence, in one example implementation, in situations where the instruction buffer 40 is detected to be empty, and taking account of any determined number of clock cycles that it would be appropriate to wait after the instruction buffer is empty to ensure that all instructions output by the instruction buffer have passed through the decoder circuitry 55, the processor core 25 may be arranged to resample at its interface 87 the current scrambling key value produced by the scrambling key generator 85, and thereafter use that sampled scrambling key value for subsequent scrambling and unscrambling operations. Any subsequently retrieved instructions will hence be scrambled by the scrambling circuitry 35 using the new scrambling key value, and as a result any scrambled instruction present in the instruction buffer 40 will have been scrambled using the new scrambling key value. Further, the decoder circuitry 55 will be provided with that new scrambling key value, and hence can correctly descramble those scrambled instructions when received over the input path 50.

Figure 2:
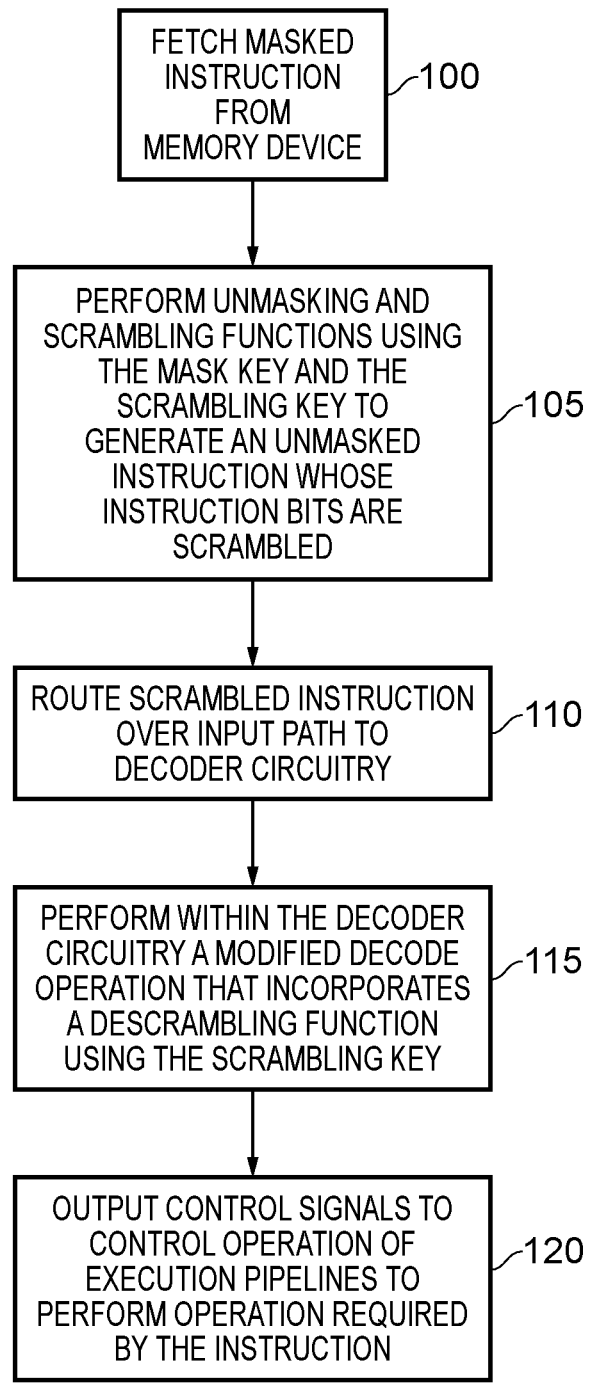
FIG. 2 is a flow diagram illustrating steps performed by the processor core of FIG. 1 in accordance with one example arrangement.

FIG. 2 is a flow diagram illustrating operations performed by the processor core 25 in order to process instructions retrieved from the encrypted flash memory 20, in accordance with one example implementation. At step 100, a masked instruction is fetched from the flash memory 20. It will be appreciated that in some implementations multiple instructions may be fetched at the same time, and in that event each of the fetched instructions may be subjected to the operations illustrated in FIG. 2.

At step 105, unmasking and scrambling functions are performed on the fetched instruction using the mask key applicable to the address range from which the instruction has been retrieved, and the scrambling key provided by the interface 87, in order to generate an unmasked instruction whose instruction bits are scrambled, with that scrambled instruction then being placed within the instruction buffer 40.

Subsequently the instruction will be routed over the input path 50 to the decoder circuitry 55 at step 110, whereafter at step 115 a modified decode operation will be performed within the decoder circuitry 55 that incorporates a descrambling function using the scrambling key provided from the interface 87. As a result of the descrambling function, the decoder circuitry will correctly identify each instruction bit, and hence can decode that instruction based on knowledge of the instruction set in order to determine the appropriate control signals. Thereafter at step 120, the appropriate control signals can be output to an execution pipeline 60 in order to control operation of that pipeline to perform the operation required by the instruction.

Figure 3:
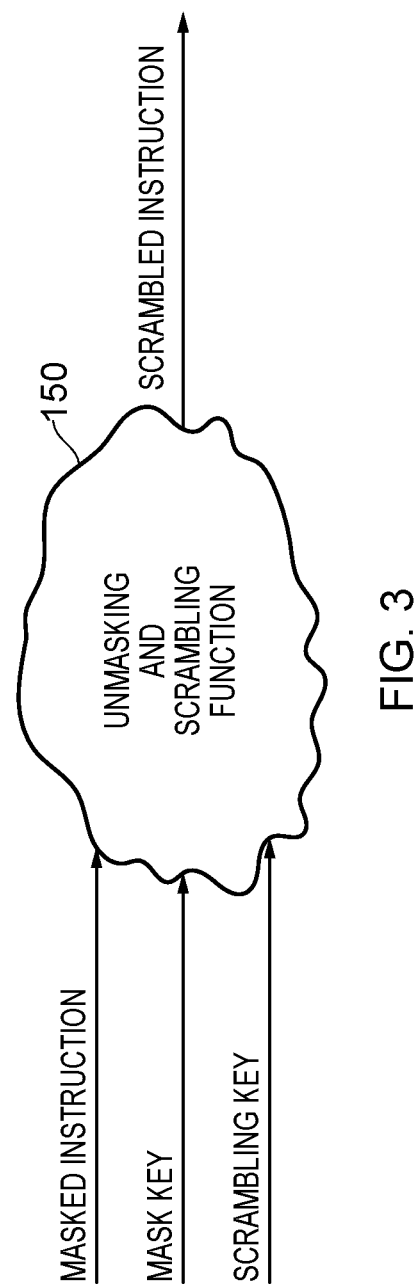
FIG. 3 schematically illustrates an unmasking and scrambling function that may be implemented within the fetch unit of FIG. 1 in accordance with one example arrangement.

Whilst the unmasking and scrambling circuitry 35 could in principle be arranged to first perform the unmasking operation and subsequently perform the scrambling operation, this would mean that there is a point in time at which the instruction in its standard form is present within the processor core. In order to increase robustness of the system, in one example implementation the unmasking and scrambling functions are integrated together as schematically shown in FIG. 3. In particular, the masked instruction is provided as an input to a combined unmasking and scrambling function 150 that also receives the mask key and the scrambling key. The unmasking and scrambling function 150 produces directly as its result the scrambled instruction without generating as an intermediate result the unmasked instruction in unscrambled form.

Figure 4:
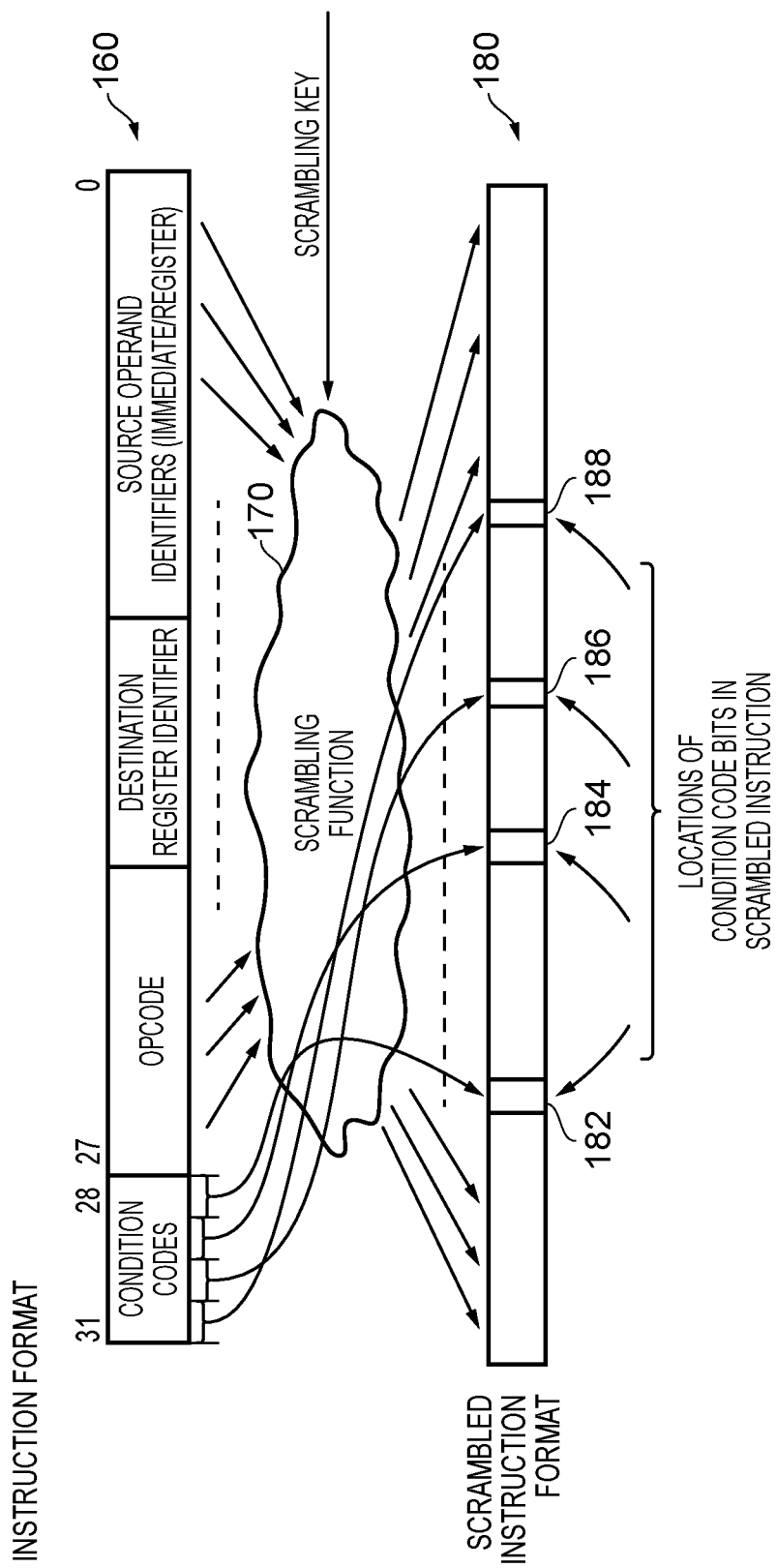
FIG. 4 schematically illustrates how the use of a scrambling function may alter the location of the bits within an instruction that identify particular properties of the instruction.

FIG. 4 illustrates a possible instruction format for the example of a 32-bit instruction 160. As shown, a certain number of bits may be used to identify condition codes that are analysed in order to determine whether the instruction should be executed, i.e. whether the data processing operation identified by the instruction should be performed. Further, as shown in FIG. 4, a series of other bits within the instruction may specify the opcode. This identifies the data processing operation to be performed, for example identifying whether an add operation is required, a multiply operation, etc. Another field comprising a series of bits may specify a destination register identifier, this being used to identify a register within the register bank 65 into which the result should be stored by the execution pipelines 60. Further, one or more fields may identify one or more source operands. In some instances one or more source operands may be specified as immediate values i.e. the sequence of bits within the instruction directly identifies the source operand value. However, typically one or more of the source operands will be identified with reference to a register, and hence a register within the register bank 65 may be identified as the register containing a source operand value to be used when performing the data processing operation.

As shown in FIG. 4, if the 32 separate instruction bits are input to the scrambling function 170, then using the scrambling key the scrambling function can reorder the various instruction bits in order to produce a scrambled instruction format 180. As schematically shown in FIG. 4 in relation to condition code bits 28 to 31, those individual instruction bits may hence be reproduced in entirely different locations within the scrambled instruction format, with those locations being dependent on the scrambling key. Purely by way of specific example, in FIG. 4 it is assumed that the four condition code bits actually appear at locations 182, 184, 186, 188 within the scrambled instruction. It should be noted that there is a one to one correspondence between the instruction bits in both the original instruction format and in the scrambled instruction format, and hence in this example the scrambled instruction also contains 32 bits. However, since the scrambling key is secret, an attacker cannot determine which wire within the input path 50 will carry any particular instruction bit, and hence cannot perform a targeted attack on the physical wires to seek to manipulate the instruction in any predictable way.

FIG. 5 schematically illustrates the descrambling function that may be performed within the decoder circuitry as part of the decode operation. In particular, the scrambled instruction is provided as an input and the descrambling function is applied to that scrambled instruction using the scrambling key, in order to determine each original instruction bit. In the particular example shown, the descrambling function is a bijective function, and hence can be identical to the scrambling function that was originally used by the unmasking and scrambling circuitry 35. By reapplying the scrambling function, using the same scrambling key, this merely reverses the effect of the original scrambling function. FIG. 5 shows the specific operations performed in order to regenerate the condition code bits 31 to 28. In particular, the result of the four operations identified is that the values in the locations 182, 184, 186, 188 of the scrambled instruction format 180 of FIG. 4 will be extracted, and output as the condition code bits 31 to 28, thereby allowing the decode circuitry to then correctly interpret the condition codes in order to determine whether the instruction is to be executed or not. It will be appreciated that similar functionality can be employed to extract all of the other information within the scrambled instruction format in order to determine the originally specified opcode, the destination register identifier, the source operand identifiers, etc.

Figure 6:
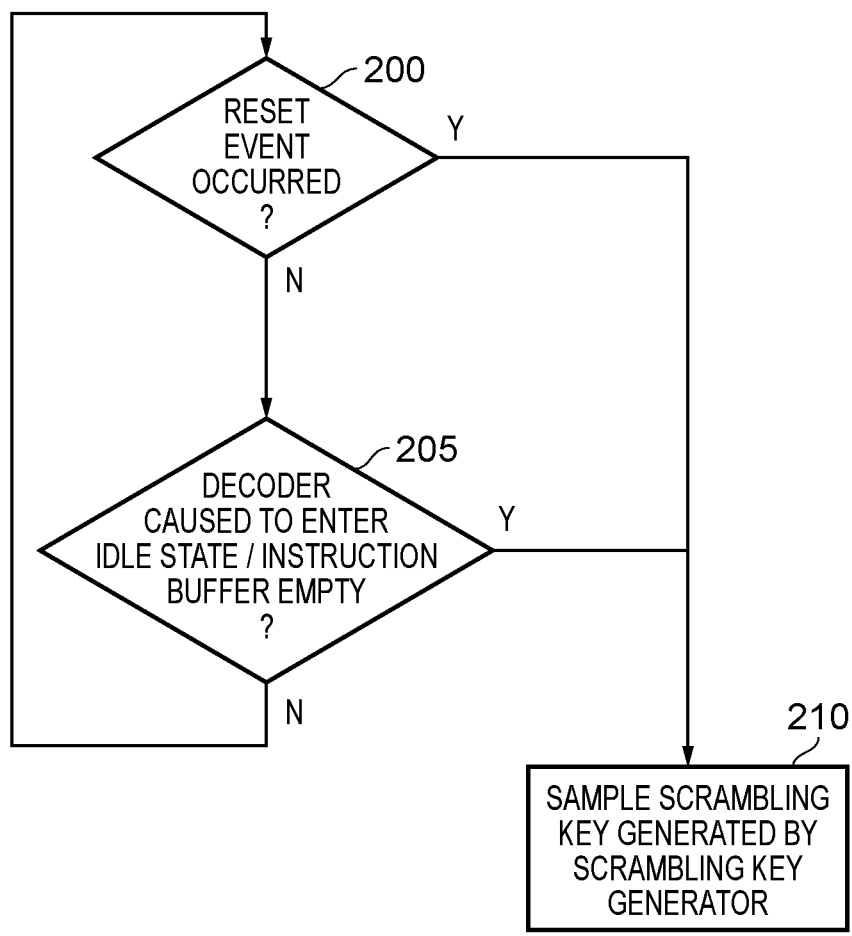
FIG. 6 illustrates a mechanism that may be employed to change the scrambling key used by the processor core in FIG. 1, in accordance with one example implementation.

As mentioned earlier, if desired, the scrambling key can be changed upon occurrence of one or more determined events. This is schematically illustrated by the flow diagram of FIG. 6. At step 200, the processor core 25 determines whether a reset event has occurred, and if so the process proceeds to step 210 where the processor core 25 samples the scrambling key generated by the scrambling key generator 85, latching that sampled value within the interface component 87.

However, even in the absence of a reset event, there may be one or more other determined events that will cause the scrambling key to be changed. In particular, as shown by step 205, it can be determined whether the decoder has been caused to enter an idle state and/or whether the instruction buffer 40 is empty. If it is known that there are no instructions in the instruction buffer, and the decoder circuitry is not actively decoding any instructions, then this represents a safe point in time for changing the scrambling key, since none of the functionality to be performed by the core 25 will at that point be dependent on the previous scrambling key value. Accordingly, if it is determined that the decoder has entered the idle state and the instruction buffer is empty, the process proceeds to step 210 where again the scrambling key generated by the scrambling key generator 85 may be sampled at the interface 87.

By employing the techniques described herein, this can significantly improve protection against hacker attacks in respect of the processor core, and in particular can inhibit any attempts to seek to manipulate the instructions being input to the decoder of the processor.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
execution circuitry to perform data processing operations in response to a sequence of instructions from an instruction set;
decoder circuitry to decode each instruction in the sequence in order to generate control signals for the execution circuitry to cause the execution circuitry to perform the data processing operations required by the sequence of instructions, each instruction in the sequence comprising a plurality of instruction bits and the decoder circuitry being arranged to perform a decode operation on each instruction in the sequence to determine from a value of each instruction bit, and knowledge of the instruction set, the control signals to be issued to the execution circuitry in response to that instruction;
an input path to the decoder circuitry comprising a set of wires over which the instruction bits of each instruction in the sequence are provided;
scrambling circuitry to perform a scrambling function on each instruction in the sequence using a secret scrambling key, such that a wire within the set of wires over which any given instruction bit is provided to the decoder circuitry is dependent on the secret scrambling key;
wherein the decode operation performed by the decoder circuitry is arranged to incorporate a descrambling function using the secret scrambling key to reverse an effect of the scrambling function, such that, independent of which wire any given instruction bit is provided on, the decode operation is arranged when decoding a given instruction to correctly interpret each instruction bit of that given instruction, based on knowledge of the instruction set, in order to determine from the value of each instruction bit the control signals to be issued to the execution circuitry in response to that given instruction; and
fetch circuitry to fetch the sequence of instructions from a memory device, the fetch circuitry having an instruction buffer to store the fetched instructions prior to provision of the fetched instructions over the input path to the decoder circuitry;
wherein the scrambling circuitry is provided in association with the fetch circuitry to apply the scrambling function to the fetched instructions prior to the fetched instructions being stored in the instruction buffer;
wherein the sequence of instructions as stored in the memory device are encrypted;
the apparatus further comprises decryption circuitry to decrypt the sequence of instructions prior to provision of the sequence of instructions to the decoder circuitry; and
the scrambling circuitry is incorporated within the decryption circuitry.

2. The apparatus as claimed in claim 1, wherein the decryption circuitry and the scrambling circuitry are integrated so that each input encrypted instruction is subjected to a combined decryption and scrambling operation that generates as an output a corresponding decrypted instruction with positions of its instruction bits scrambled based on the secret scrambling key, without generating as an intermediate result the corresponding decrypted instruction in unscrambled form.

3. The apparatus as claimed in claim 2, wherein:
the sequence of instructions as stored in the memory device are encrypted using a masking function based on a secret mask key; and
the combined decryption and scrambling operation receives as inputs an input encrypted instruction, the secret mask key and the secret scrambling key.

4. The apparatus as claimed in claim 1, wherein a value of the secret scrambling key is changed on occurrence of a determined event.

5. The apparatus as claimed in claim 4, further comprising an interface to sample, on occurrence of the determined event, the value of the secret scrambling key as provided by a scrambling key generator.

6. The apparatus as claimed in claim 4, wherein the determined event comprises a reset of the apparatus.

7. The apparatus as claimed in claim 1, wherein the scrambling function and the descrambling function are a bijective function.

8. An apparatus comprising:
execution circuitry to perform data processing operations in response to a sequence of instructions from an instruction set;
decoder circuitry to decode each instruction in the sequence in order to generate control signals for the execution circuitry to cause the execution circuitry to perform the data processing operations required by the sequence of instructions, each instruction in the sequence comprising a plurality of instruction bits and the decoder circuitry being arranged to perform a decode operation on each instruction in the sequence to determine from a value of each instruction bit, and knowledge of the instruction set, the control signals to be issued to the execution circuitry in response to that instruction;

an input path to the decoder circuitry comprising a set of wires over which the instruction bits of each instruction in the sequence are provided; and scrambling circuitry to perform a scrambling function on each instruction in the sequence using a secret scrambling key, such that a wire within the set of wires over which any given instruction bit is provided to the decoder circuitry is dependent on the secret scrambling key;

wherein the decode operation performed by the decoder circuitry is arranged to incorporate a descrambling function using the secret scrambling key to reverse an effect of the scrambling function, such that, independent of which wire any given instruction bit is provided on, the decode operation is arranged when decoding a given instruction to correctly interpret each instruction bit of that given instruction, based on knowledge of the instruction set, in order to determine from the value of each instruction bit the control signals to be issued to the execution circuitry in response to that given instruction;

wherein a value of the secret scrambling key is changed on occurrence of a determined event;

wherein the determined event comprises an event indicating that the decoder circuitry is in an idle state where no active instructions are in the process of being decoded by the decoder circuitry.

9. An apparatus comprising:

execution circuitry to perform data processing operations in response to a sequence of instructions from an instruction set;

decoder circuitry to decode each instruction in the sequence in order to generate control signals for the execution circuitry to cause the execution circuitry to perform the data processing operations required by the sequence of instructions, each instruction in the sequence comprising a plurality of instruction bits and the decoder circuitry being arranged to perform a decode operation on each instruction in the sequence to determine from a value of each instruction bit, and knowledge of the instruction set, the control signals to be issued to the execution circuitry in response to that instruction;

an input path to the decoder circuitry comprising a set of wires over which the instruction bits of each instruction in the sequence are provided;

scrambling circuitry to perform a scrambling function on each instruction in the sequence using a secret scrambling key, such that a wire within the set of wires over which any given instruction bit is provided to the decoder circuitry is dependent on the secret scrambling key;

wherein the decode operation performed by the decoder circuitry is arranged to incorporate a descrambling function using the secret scrambling key to reverse an effect of the scrambling function, such that, independent of which wire any given instruction bit is provided on, the decode operation is arranged when decoding a given instruction to correctly interpret each instruction bit of that given instruction, based on knowledge of the instruction set, in order to determine from the value of each instruction bit the control signals to be issued to the execution circuitry in response to that given instruction;

wherein a value of the secret scrambling key is changed on occurrence of a determined event; and the apparatus further comprising:

fetch circuitry to fetch the sequence of instructions from a memory device, the fetch circuitry having an instruction buffer to store the fetched instructions prior to provision of the fetched instructions over the input path to the decoder circuitry;

wherein the determined event is an indication that the instruction buffer is empty.

\* \* \* \* \*